Reissued Nov. 29, 1932

Re. 18,676

UNITED STATES PATENT OFFICE

ERWIN R. LEDERER, OF FORT WORTH, TEXAS, ASSIGNOR TO TEXAS PACIFIC COAL & OIL CO., OF FORT WORTH, TEXAS, A CORPORATION OF TEXAS

LUBRICATING OIL AND METHOD OF PRODUCING THE SAME

No Drawing. Original No. 1,803,941, dated May 5, 1931, Serial No. 344,605, filed March 5, 1929. Application for reissue filed April 16, 1932. Serial No. 605,781.

This invention relates to a method of producing fully dewaxed, unblended paraffin base lubricating oil of a cold test of approximately 0° F., such as described and claimed as an article of manufacture independent of its process of manufacture in my copending application, Serial No. 334,607, filed January 23, 1929, which is a continuation in part of my previous application Ser. No. 257,110, filed Feb. 25, 1928, and to the low cold test residual or cylinder stock lubricating oil of high viscosity as produced by the processes herein described, or essentially similar process for cold dewaxing.

The object of the invention is to provide a process or method for the handling of paraffin base crude, in this particular instance Ranger crude, as produced in Eastland and Stephens Counties in the State of Texas although applicable to paraffin base crude oil from other localities, so as to effect, during the distilling, refining and purifying operation, the structure of the paraffin base in the manner which is most favorable for complete removal of the paraffin wax constituent, and the production of a low cold test residual or high viscosity lubricating oil.

It is generally conceded that paraffin base oils are best for lubricating purposes as such oils continue to supply the desired lubricating film in automotive engines and machines even when the latter are heated up to relatively high degrees. Paraffin base oils as produced prior to my invention have, however, had the disadvantage of congealing or failing to flow at temperatures approaching zero Fahrenheit because of the previous impossibility of commercially fully dewaxing paraffin base oils.

I have been able to fully dewax paraffin base lubricating oils and am able to produce a pure fully dewaxed unblended and uncompounded paraffin base oil which will be free flowing at temperatures below its cold test and which, in view of its lubricating properties at high temperatures as well, can be used for both summer and winter driving conditions or for aeroplane work, eliminating the necessity for producing and marketing two grades of lubricating oil for these different conditions.

Scientific and performance tests have shown that paraffin base lubricating oils having a lower temperature coefficient of viscosity will stand high operating temperatures better than the asphalt base oils which have a tendency to break up under high operating temperature. It is also recognized that the use of unblended lubricating oils having hydrocarbons in the natural order of their occurrence in the crude oil provide a more stable oil, better adapted for use at high temperatures than the blended and mixed oils which have constituents vaporizing through a wide range of temperatures.

While my process, in general, observes the same steps and sequence of steps which are normally followed in the refining and purifying of lubricating oils, I have found that particular care is necessary not only in the distilling, but in the refining and dewaxing steps to place or preserve the paraffin or wax base in an amorphous condition in which the same may be fully removed from the oil prior to placing the same on the market.

In substance, I provide an originally residual paraffin base oil by careful distillation, which contains substantially all amorphous wax and then remove the asphaltic and tarry impurities and discolorizing and solid impurities while maintaining the wax in an amorphous condition and then completely remove the wax from the oil by chilling and dewaxing.

In manufacturing these low cold test fully dewaxed paraffin base lubricating oils according to my preferred process during the regular process of distillation, gasoline, kerosene, gas oils, cracking stocks and non-viscous neutrals, etc., are distilled overhead in a continuous battery of stills or in specially constructed tubular stills equipped with fractionating equipment until in the last still of the continuous battery or in the vacuum tower of the tubular still a lubricating stock of approximately 90″ to 100″ viscosity at 210° F. is obtained. During the process of distillation, the stills are kept at a temperature of 20 to 50° lower than in ordinary practice, or at approximately the lower range of the boiling or distilling temperature of the particular fraction, using a great amount of bottom steam applied to the oil under low pressure and with a maximum volume. The stills are kept dragging from six (6) to eight (8) hours longer than in ordinary practice. I have found that this lower temperautre in the distilling operation bringing about a slow distillation with no tendency to overheat and no cracking or scorching of the oil prevents the formation of a wax having a definite crystalline structure and provides in the last still or the long residuum a bright stock of good green color and sweet odor containing substantially all amorphous wax which can be, by the subsequent steps described below, completely dewaxed if care is observed to maintain the wax in its amorphous condition, whereas crude oil from the same sources, when subjected to a distilling operation in which the stills are maintained at or near the maximum temperature for each particular fraction, often comes from the last still with a crystalline wax formation which subsequently defies complete removal from the oil or when carelessly handled, the amorphous wax may be converted into a non-removable variety in the asphalt removal or decolorizing steps.

Upon removal from the last still, the bright stock in my preferred process may be stored and aged from thirty to sixty days at an even temperature in special storage tanks although this is not essential and is then treated in regulation agitators at a temperature of from 115 to 125° F. with a minimum of 35 lbs. per barrel of 98% sulphuric acid. If necessary, the temperature of the oil is reduced, by means of the cooling system, to 115 to 125°, or, in winter is raised, by suitable heating means. The low temperature at which the oil is subjected to the sulphuric acid or other asphalt removal treatment is important as it affects the oxidization of the paraffins in the oil, making it easier to control their proper solidification when chilling. Temperatures above 120° F. in the presence of acid also affect the solubility of any asphalt bodies in the paraffin, thereby retarding the desired formation of the paraffin which is necessary for proper separation in the production of low cold test lubricating oil.

The sludges including tarry and resinous matter produced by the sulphuric acid treatment are drawn from the agitator and the clean acid oil again pumped to storage where further settling of the sludges is permitted to take place at a storage temperature around 150° F.

The acid oil is then mixed with filtering and decolorizing clay pulp which has been suitably prepared using .2 pounds or upwards per gallon of oil and the mixture of clay pulp and oil is passed through a tubular pipe still heated to 420° F., after which the temperature is reduced to 135° F., the oil-pulp mixture diluted with 40% or more of short boiling range naphtha to reduce the gravity to 36–38 Bé. and is then forced through a filter, preferably of the pressure type, to separate the clay from the oil. The filtered oil is further diluted with an additional 30% of naphtha to produce a gravity of 46–48 Bé., and the mixture is chilled in special chilling tanks, with special care that the chilling shall be an uninterrupted procedure, reducing the temperature about 2½° every hour until a temperature of 10° F. above zero is reached. From this point down, the oil is chilled as rapidly as possible and held at a minimum temperature of −20 to −40° with agitation, to complete the precipitation of paraffin from solution, so as to permit it to be removed in a single step dewaxing operation by mechanical means, such as centrifuging or filtering. The mixture is then preferably centrifuged in super centrifuges of the Sharpless type, using ¼ inch feed nozzles and a ring size of 41 to 42 which reduces the velocity of the oil being fed to effect a more thoroughly complete separation of the wax from the oil. Separation of the solidified wax and the chilled oil may be effected by passing through a suitable filter. After removal of the wax in this manner, the oil is redistilled at a low temperature, preferably not exceeding 500° F. with a considerable amount of low pressure steam to distill off the blending naphtha and neutrals, leaving the zero cold test fully dewaxed paraffin base lubricating oil in condition for commercial use.

The oil produced in this manner is a straight-run, unblended, unmixed paraffin base oil with the viscosity of from 50″ at 210° F. to 200″ at 210° F. Saybolt universal viscosimeter and has a cold test of from 15 below zero or lower to 10° F. It is free flowing at pressures from 7 to 10 pounds even at temperatures as low as minus 40° F. Lubricating oil of these characteristics has never been produced prior to my production of the same and satisfies in many ways the ideal standard for a universal summer and winter lubricating oil which has been set by the aeroplane and automotive lubrication engineers. Being a paraffin base lubricating oil, this new oil provides for better lubrication at high temperatures, and as the oil is unmixed or unblended paraffin base, there are no light ends to distill off or be destroyed by the high temperature. As it is fully dewaxed, it is free flowing and can be pumped under normal pump pressures of from 7 to 10 pounds at temperatures even as low as minus 40° F. and therefore provides for proper lubrication at low temperatures. The process, therefore, produces a lubricating oil which is superior at all temperatures to the normal lubricating oils and may be used for both summer and winter driving and for aeroplanes in which wide variations in temperature are experienced in a relatively short period of time in altitude flights, without the necessity of carrying two grades of oil.

The oil produced has the following characteristics:

1. It is an unblended residuum paraffin base lubricating oil.

2. It is completely dewaxed, i. e., free from wax for commercial purposes.

3. Its viscosity on the Saybolt universal viscosimeter is from 50″ at 210° F. to 200″ at 210° F. but preferably from 60″ at 210° F. to 200″ at 210° F.

4. It will flow at pressures from 7 to 10 lbs. absolute at temperatures from plus 20° F. to minus 40° F.

5. It retains its lubricating properties at higher temperatures and being unblended, there is no tendency of any lighter fractions to distill over at higher operating temperatures.

While in general the process I use corresponds to conventional commercial processes in the treatment and preparation of lubricating oils, I do not know any process outside the principles of the one disclosed which will result in a completely dewaxed lubricating oil of a viscosity of 55″ at 210° up to 160″ at 210°, nor is it possible with the ordinary run of bright stock to produce a fully dewaxed paraffin base lubricating oil because in the normal distilling operation without special care exercised in my process, the high temperatures of the still precludes the desired amorphous condition of paraffin and the subsequent treatment with sulphuric acid and subsequent chilling will not convert this wax structure into that desired to permit complete removal of the wax from the oil by any known means.

While I have described my process and the prefrred method of performing the same with considerable detail, it will be understood that variations may be made in the specific steps and that the sequence of the steps may be altered without departing from the spirit of my invention or the scope of the appended claims.

It will also be understood that the term "cylinder stock" as used herein, when applied to a finished oil, from which the asphalt, tarry ingredients and discoloring material have been removed, is synonymous with the trade term "Bright stock".

What I claim as my invention is:

1. The method of producing a fully dewaxed paraffin base residual lubricating oil having a cold test below 0° F. and a viscosity above 90″ at 210° F. from oil from which the lighter fractions have been distilled to provide substantially amorphous wax in the still residue which comprises treating the still residue after aging, with sulphuric acid below 125° F., treating the oil with a decolorizing clay, filtering the clay from the oil, diluting the oil and chilling to −20° to −40° F. to solidify the wax, separating the solidified wax and removing the diluent from the oil.

2. The method of removing wax from a paraffin base lubricating oil wherein a centrifuge having a #41 to 42 separating ring and ¼ inch nozzles is used which comprises treating the still base, from which the lighter fractions have been distilled so that the residue contains wax substantially all of which is in amorphous form, after ageing from 30 to 60 days at an even temperature with a minimum of 35 pounds per barrel of 98% sulphuric acid at 115 to 125° F., removing the acid sludge, reheating the oil with a decolorizing clay, separating the clay from the oil, diluting the oil, chilling to −20 to −40° F. to solidify the wax, passing the chilled oil through said centrifuge to separate the wax from the oil.

3. The method of producing fully dewaxed 0° F. cold test paraffin base residual lubricating oil from crude oil from which the lighter fractions have been distilled at a temperature approximating the lower range of the boiling temperature of the particular fraction to provide a residuum bright stock of green color and sweet odor, containing amorphous wax and substantially free from crystalline wax, which would interfere with centrifugal separation of the wax and oil, which comprises ageing the residuum oil, treating the same with sulphuric acid at 115 to 125° F., removing the acid sludge, storing the oil to permit settling of the acid sludge, treating the oil with clay at a temperature approximating 420° F., reducing the temperature of the clay and oil to 135° F., diluting the oil with naphtha and filtering to remove the clay further diluting the oil, chilling at a rate approximately 2½° per hr. to about 10° F. and chilling more rapidly to −20 to −40° below zero, centrifuging the wax from the oil, and separating the diluent from the dewaxed oil.

4. The method of producing fully dewaxed 0° F. cold test paraffin base residual lubricating oil from paraffin base crude oil from which the lighter fractions have been distilled at a temperature approximating the lower range of the boiling temperature of the particular fraction to produce a residual oil containing amorphous wax and substantially free from crystalline wax which comprises ageing the residuum oil, treating the same with sulphuric acid below 125° F., removing the acid sludge, treating the oil with clay below the temperature which would cause conversion of amorphous to crystalline wax, reducing the temperature of the clay and oil, diluting the oil with naphtha and filtering to remove the clay, chilling to from −20 to −40° below zero, removing the wax, and separating the diluent from the dewaxed oil.

5. The method of producing a fully dewaxed 0° F. to 10° F. cold test residual lubricating oil having a viscosity of 50″ to 200″ at 210° F. from the still residue, or bright stock or paraffin base crude oil which has been distilled to prevent overheating and conversion of amorphous to crystalline wax which comprises ageing the still residue, removing the asphaltic and tarry ingredients by sulphuric acid treatment, removing the discoloring material, diluting the oil, chilling to −20° to −40° F. to precipitate the wax, centrifuging the wax from the chilled oil and separating the diluent from the dewaxed oil.

6. The method of producing a fully dewaxed paraffin base oil having a cold test below 0° F. and viscosity above 90″ at 210° from an originally residual undewaxed base containing amorphous wax and substantially free from crystalline wax which comprises removing asphaltic impurities by sulphuric acid treatment while maintaining the wax in an amorphous condition, removing solid and discoloring impurities by clay treatment while maintaining the wax in an amorphous condition, thinning the oil with a solvent, chilling to −20° F. to −40° F. to congeal the wax, separating the congealed wax from the chilled oil and separating the solvent from the dewaxed oil.

7. The method of fully dewaxing paraffin base residual oil which may be partially dewaxed at higher temperatures which comprises providing a residual oil from which the lighter fractions have been distilled so as to provide substantially all amorphous wax in the residue, by ageing the residue, treating with sulphuric acid to remove asphaltic and tarry ingredients, treating with decolorizing clay, diluting with a lighter hydrocarbon, chilling to −20 to −40° F. separating the wax from the chilled oil and distilling off the diluent.

8. The below 0° F. cold test dewaxed residual paraffin base lubricating oil, having a viscosity of 60″ at 210° F. to 200″ at 210° F. produced from refined still residue from which the lighter fractions have been distilled so as to provide substantially all amorphous wax in the residue by treatment of the residue with sulphuric acid below 125° F., to maintain the wax in an amorphous condition, treatment with decolorizing clay, diluting and chilling to −20° F. to −40° F., separating the wax from the chilled oil, and separating the diluent from the dewaxed oil.

9. The cold dewaxed unblended paraffin base, residual lubricating oil having a viscosity of from 50 seconds at 210° F. to 200 seconds at 210° F. on the Saybolt universal viscosimeter and a cold test zero to 10° F. and capable of flowing freely at 7 to 10 lbs. absolute pressure at temperatures as low as −30° F., produced from originally residual cylinder stock containing amorphous wax and substantially free from crystalline wax by treatment with sulphuric acid to remove tarry and asphaltic ingredients, treatment with filter clay to remove discoloring material, dilution of the oil with lighter hydrocarbons, chilling to −30° to −40° F., separating the wax from the chilled oil and separating the diluent from the dewaxed oil.

10. The all season lubricating oil for use in automobile and aeroplane engines, comprising an unblended fully dewaxed paraffin base residual oil, having a flash point above 480° F. a Saybolt viscosity above 90″ at 210° F. and a cold test below zero F. and being free flowing at pump intake pressures of 7 to 10 lbs. as low as −40° F., produced from paraffin base crude oil from which the lighter fractions have been distilled at a temperature approximating the lower range of boiling temperature of the particular fraction to provide a still residue containing wax substantially all of which is an amorphous form, by treatment of the still residue with sulphuric acid below 125° F. to remove tarry and asphaltic ingredients, treatment with filter clay to remove discoloring material, dilution of the oil with lighter hydrocarbons, chilling to −30° to −40° F., separating the wax from the chilled oil and separating the diluent from the dewaxed oil.

11. An all season lubricating oil for uses in automotive engines, comprising an unblended fully dewaxed paraffin base residual oil having a flash point above 480° F. a Saybolt viscosity of from 88″ at 210° F. to 155″ at 210° F. and a cold test of from zero to −15° F. and being free flowing at pump intake pressures of 7 to 10 lbs. as low as −40° F., produced from paraffin base crude oil from which the lighter fractions have been distilled to provide a still residue containing wax substantially all of which is an amorphous form, by treatment of the still residue with sulphuric acid below 125° F. to remove tarry and asphaltic ingredients, treatment with filter clay to remove discoloring material, dilution of the oil with lighter hydrocarbons, chilling to below −20° F., centrifuging the wax from the chilled oil and separating the diluent from the dewaxed oil.

12. The low cold test unblended paraffin base lubricating oil free of wax, having a viscosity of from 50 seconds at 210° F. to 200 seconds at 210° F. on the Saybolt universal viscosimeter and a cold test of zero to 10° F. prepared from an originally residual stock containing amorphous wax and substantially free from crystalline wax by treatment of the residual stock to remove tarry and asphaltic ingredients by steps equivalent to acid treatment while maintaining the wax in an amorphous condition, treatment with filter clay to remove discoloring material while maintaining the wax in an amorphous condition, dilution of the oil with lighter hydrocarbons, chilling to −20° to 40° F., separating the wax from the chilled oil and separating the diluent from the dewaxed oil.

13. The below 0° F. cold test dewaxed unblended paraffin base lubricating oil having a viscosity above 90″ at 210° F. produced from an original residual undewaxed base containing amorphous wax and substantially free from crystalline wax by removing the asphaltic and tarry impurities by sulphuric acid treatment while maintaining the wax in an amorphous condition, removing solid and discoloring impurities while maintaining the wax in an amorphous condition, thinning the oil with a solvent, chilling to −20° F. to −40° F. to congeal the wax, separating the congealed wax from the chilled oil and separating the solvent from the dewaxed oil.

14. The method of producing a dewaxed 0° F. to 10° F. cold test finished lubricating oil having a viscosity of 50″ to 200″ at 210° F. from the residual cylinder stock of paraffin base crude oil in a single stage dewaxing operation which comprises removing the asphaltic and tarry ingredients by acid treatment, removing the discoloring material, thereafter diluting and chilling the oil to −20° to −40° F. to precipitate the wax, centrifugally separating the wax from the chilled oil and separating the diluent from the dewaxed oil.

15. The method of fully dewaxing paraffin base oil of cylinder stock characteristics to substantially 0° F. cold test which comprises providing an oil of cylinder stock characteristics from which the lighter fractions have been distilled so as to provide substantially all amorphous wax in said oil, removing asphaltic and tarry ingredients by acid treatment, treating with decolorizing clay, thereafter diluting with a lighter hydrocarbon, chilling to 20° F. or below centrifugally separating the wax from the chilled oil and distilling off the diluent.

16. The method of producing a dewaxed paraffin base residual oil having a cold test of substantially 0° F. from an originally residual undewaxed base containing amorphous wax and substantially free of crystalline wax which comprises providing a residual oil from which the lighter fractions have been distilled so as to provide substantially all amorphous wax in the residue, removing the asphalt and tarry impurities by acid treatment, removing the discoloring material thereafter thinning the oil with a solvent, chilling to −20° F. to −40° F. to congeal the wax, separating the congealed wax from the chilled oil and separating the solvent from the dewaxed oil.

17. A low cold test finished paraffin base single dewaxed lubricating oil having a viscosity of from 50 seconds at 210° F. to 200 seconds at 210° F. on the Saybolt universal viscosimeter and a cold test without blending of zero to 10° F. and prepared from an originally residual stock in which the wax is sufficiently amorphous for removal by centrifugal separation when precipitated by chilling, by removal of the asphalt, tarry and discoloring material by acid and clay treatment thereafter diluting, chilling to precipitate the wax and centrifugally separating the precipitated wax from the chilled solution of the oil.

18. A low cold test, dewaxed, natural, unblended residual lubricating oil having a viscosity of 50″ to 200″ at 210° F. and a cold test of −15 to plus 10° F. produced from an original undewaxed residue in which the wax is in sufficiently amorphous form for centrifugal removal when precipitated by chilling, by removal of the asphalt, tarry and discoloring materials by acid and clay treatment thereafter diluting the residue with a solvent, chilling the solution to a temperature between −20° F. and −40° F. to precipitate the wax and centrifugally separating the precipitated wax from the chilled solution of the oil.

19. A low cold test, dewaxed, unblended, natural paraffin base lubricating oil having a cold test of 0° F. to 10° F. and a viscosity of 70″ to 200″ at 210° F. which is obtained from wax-containing petroleum of cylinder stock characteristics in which the wax originally present is in sufficiently amorphous form for continuous centrifugal removal when precipitated by chilling, produced by first removing the asphalt, tarry and discoloring materials, by acid and clay treatment thereafter diluting, chilling to precipitate the wax, centrifugally removing the precipitated wax from the chilled solution of the oil and removing the diluent from the dewaxed oil.

20. A cold dewaxed unblended paraffin base residual lubricating oil having a viscosity of from 50 seconds at 210° F. to 200 seconds at 210° F. on the Saybolt universal viscosimeter, a cold test of 0 to 10° F. and capable of flowing freely at 7 to 10 lbs. pump intake pressure at temperatures as low as minus 30° F. produced by purifying the residue, by acid and clay treatment thereafter, diluting, chilling to −20 to −40° F. to congeal the wax, centrifugally separating the congealed wax from the dilute oil and separating the diluent from the oil.

21. A low cold test unblended paraffin base lubricating oil free of wax, having a viscosity of from 50 seconds at 210° F. to 200 seconds at 210° F. on the Saybolt universal viscosimeter and a cold test of 0 to 10° F. prepared from a residual cylinder stock of 90″ to 100″ viscosity at 210° F. by removing the asphalt and tarry ingredients by acid treatment, removing the discoloring material, thereafer diluting, chilling to congeal the wax, separating the congealed wax from the chilled oil by difference in specific gravity and separating the diluent from the oil.

22. An all season lubricating oil for uses in automotive engines, comprising an unblended fully dewaxed paraffin base oil of cylinder stock characteristics, having a flash point above 480° F., a Saybolt viscosity of from 50″ at 210° F. to 200″ at 210° F. and a cold test of from zero to −15° F. and being free flowing at pump intake pressures of 7 to 10 lbs. as low as minus 40° F. produced from a cylinder stock fraction by removal of the asphalt, tarry and discoloring materials, by acid and clay treatment thereafter diluting, chilling to precipitate the wax, separating the precipitated wax from the chilled oil and separating the diluent from the dewaxed oil.

23. A series of dewaxed paraffin base cylinder stock lubricating oils having in their unblended condition viscosities from 70 seconds at 210° F. to 200 seconds at 210° F. on the Saybolt universal viscosimeter and cold tests of approximately 0° F. and capable of flowing freely under pump pressures at temperatures as low as minus 30° F. produced from an oil of cylinder stock characteristics by removing asphalt, tarry and decoloring ingredients by acid and clay treatment, thereafter thinning the oil with a solvent, chilling to −20° F. or below to congeal the wax, separating the congealed wax from the chilled oil by difference in specific gravity and separating the solvent from the dewaxed oil.

24. A series of paraffin base residual cylinder stock lubricating oils having in their unblended condition viscosities of from 50 seconds at 210° F. to 200 seconds at 210° F. on the Saybolt universal viscosimeter and cold tests of minus 15 to plus 10° F. produced from paraffin base cylinder stocks by removing asphalts and discoloring material, by acid and clay treatment thereafter diluting with naphtha, chilling the diluted oil to 20° F. or below to congeal the wax, separating the congealed wax from the chilled oil by difference in specific gravity and reducing the oil to the desired viscosity and cold test.

25. A series of single dewaxed paraffin base cylinder stock lubricating oils of 0° F. cold test and viscosities of 70″ to 200″ at 210° F. produced from a finished oil of cylinder stock characteristics, which has been distilled so as to provide an amorphous wax in the stock and from which the asphalt, tarry and discoloring materials have been removed by steps equivalent to acid and clay treatment while still maintaining the wax in amorphous condition by diluting said stock, chilling to approximately −40° F. to congeal the wax, separating the congealed wax from the chilled oil in one dewaxing step, and separating the diluent from the dewaxed oil.

In testimony whereof, I have affixed my signature to this specification.

ERWIN R. LEDERER.